US009146416B2

(12) United States Patent
Yoneyama et al.

(10) Patent No.: US 9,146,416 B2
(45) Date of Patent: Sep. 29, 2015

(54) LIQUID CRYSTAL DISPLAY APPARATUS

(71) Applicant: Japan Display Inc., Minato-ku (JP)

(72) Inventors: Masanobu Yoneyama, Tokyo (JP); Shin Morita, Tokyo (JP)

(73) Assignee: Japan Display Inc., Minato-ku (JP)

( * ) Notice: Subject to any disclaimer, the term of this patent is extended or adjusted under 35 U.S.C. 154(b) by 134 days.

(21) Appl. No.: 14/065,610

(22) Filed: Oct. 29, 2013

(65) Prior Publication Data

US 2014/0125927 A1    May 8, 2014

(30) Foreign Application Priority Data

Nov. 7, 2012   (JP) ................................. 2012-245185

(51) Int. Cl.
*G02F 1/1335* (2006.01)
*G02F 1/136* (2006.01)
*G02F 1/1333* (2006.01)

(52) U.S. Cl.
CPC .... *G02F 1/133512* (2013.01); *G02F 1/133351* (2013.01); *G02F 2001/133388* (2013.01)

(58) Field of Classification Search
CPC ................... G02F 1/133509; G02F 1/133514; G02F 1/133385; G02F 1/133502; G02F 1/133512; G02F 1/36209; G02F 1/36227; G02F 2001/133388; G02B 27/46
USPC ............................................ 349/104, 44, 110
See application file for complete search history.

(56) References Cited

U.S. PATENT DOCUMENTS

| 2002/0167634 | A1* | 11/2002 | Watanabe et al. ............. 349/153 |
| 2005/0140916 | A1* | 6/2005 | Kume et al. ................... 349/156 |
| 2009/0166633 | A1 | 7/2009 | Lee et al. |
| 2011/0205623 | A1 | 8/2011 | Uehara et al. |

FOREIGN PATENT DOCUMENTS

| JP | 2002-229008 | 8/2002 |
| JP | 2003-005160 | 1/2003 |
| JP | 2004-77703 A | 3/2004 |
| JP | 2004-118025 | 4/2004 |
| KR | 10-2002-0081562 A | 10/2002 |
| TW | 200707003 A | 2/2007 |
| TW | 201025256 A | 7/2010 |

OTHER PUBLICATIONS

Office Action issued Aug. 31, 2014 in Korean Patent Application No. 10-2013-0132747 (with English language translation).
Combined Office Action and Search Report issued Apr. 9, 2015 in Taiwanese Patent Application No. 102138547 (with English language translation).
Office Action issued May 27, 2015 in Korean Patent Application No. 10-2013-0132747 (with English translation).

* cited by examiner

*Primary Examiner* — Mike Qi
(74) *Attorney, Agent, or Firm* — Oblon, McClelland, Maier & Neustadt, L.L.P.

(57) ABSTRACT

In a liquid crystal display apparatus, a pair of substrates has surfaces which is so arranged as to be opposed to each other. The one of the opposed surfaces has a display region in which pixels are arrayed in a matrix. A liquid crystal layer is held between the opposed surfaces of the pair of substrates. A first shading portion is arranged to surround the display region. A second shading portion is arranged between the first shading portion and an outer peripheral end of the one of the substrates, and is formed as discontinuous segments.

5 Claims, 7 Drawing Sheets

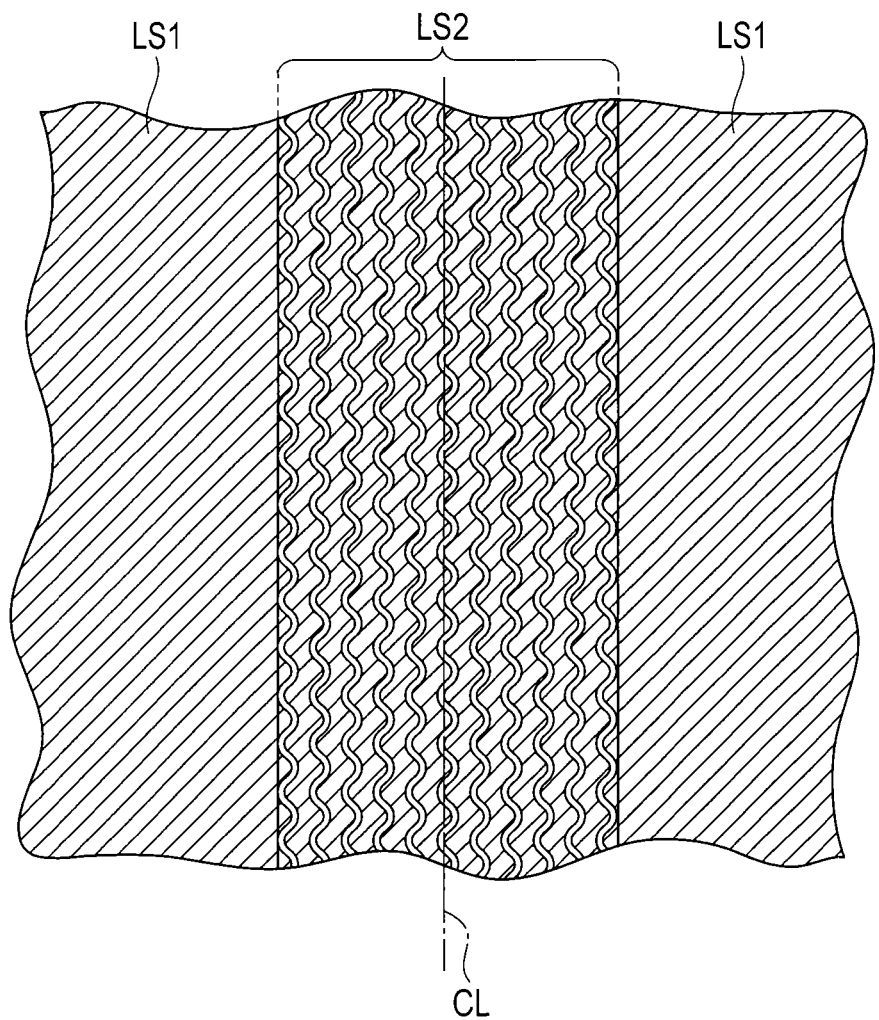
F I G. 5

US 9,146,416 B2

LIQUID CRYSTAL DISPLAY APPARATUS

CROSS-REFERENCE TO RELATED APPLICATIONS

This application is based upon and claims the benefit of priority from Japanese Patent Application No. 2012-245185, filed Nov. 7, 2012, the entire contents of which are incorporated herein by reference.

FIELD

Embodiments described herein relate generally to a liquid crystal display apparatus.

BACKGROUND

A liquid crystal display panel is mounted on each of various electronic apparatuses in view of benefits such as a light weight and low power consumption. The liquid crystal display panel comprises an array substrate and a counter substrate opposed to each other, and a liquid crystal layer held between a pair of the substrates. First motherboards which serve as a plurality of array substrates are bonded to second motherboards which serve as a plurality of counter substrates so as to be opposed to each other, the motherboards are cleaved along a cleavage line, and the liquid crystal display panel is thereby cut out.

Recently, narrowing a frame region surrounding a display screen has been required in accordance with downsizing and weight reduction of an electronic apparatus. As the frame region is narrower, a distance between an end of the display screen and an end of the liquid crystal display panel is shorter, a light beam entering the frame region is diffracted to a display region side and visually recognized by a user, and display quality is thereby deteriorated.

BRIEF DESCRIPTION OF THE DRAWINGS

FIG. 5 is a plan view of motherboards near a cleavage line, showing a part of another configuration example of the motherboards in a state in which the liquid crystal display panel shown in FIG. 1 is to be cut out;

DETAILED DESCRIPTION

The embodiments provide a liquid crystal display apparatus comprising:

a pair of substrates having surfaces opposed to each other, one of the opposed surfaces having a display region, pixels being arrayed in a matrix in the display region; and a liquid crystal layer held between the opposed surfaces of the pair of substrates, wherein a first shading portion is arranged to surround the display region, the first shading portion being provided at the one of the opposed surfaces of the pair of substrates, and a second shading portion is further provided so as to be arranged between the first shading portion and an outer peripheral end of the one of the substrates, the second shading portion being formed of discontinuous segments.

A liquid crystal display apparatus according to embodiments will be hereinafter described with reference to the accompanying drawings.

Figure 1:
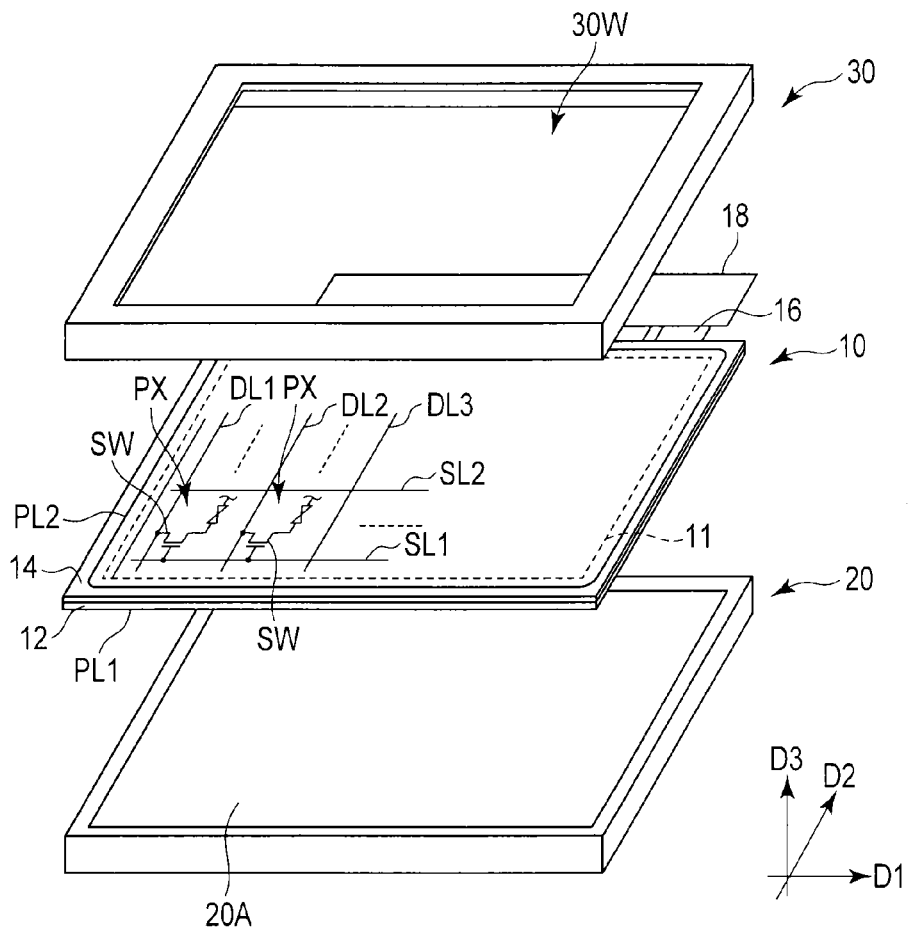
FIG. 1 is an exploded perspective view schematically showing a configuration example of a liquid crystal display apparatus according to an embodiment.

FIG. 1 is a view schematically showing a configuration example of a liquid crystal display apparatus according to a first embodiment.

The liquid crystal display apparatus comprises a liquid crystal display panel 10 having a front surface and a back surface, an illuminating module 20 configured to illuminate the liquid crystal display panel 10 from a back surface thereof, and a front cover 30 attached to the front surface side of the liquid crystal display panel 10. The front surface of the liquid crystal display panel 10 indicates a surface of a side where an image displayed on the liquid crystal display panel 10 is observed, and the back surface of the liquid crystal display panel 10 indicates a surface of a side opposite to the front surface of the liquid crystal display panel 10.

The liquid crystal display panel 10 comprises an array substrate 12 including a display region 11, a counter substrate 14 opposed to the array substrate 12, and a liquid crystal layer LQ held between the array substrate 12 and the counter substrate 14. The array substrate 12 and the counter substrate 14 have inner surfaces opposed to each other and outer surfaces opposite to the inner surfaces. Polarizing plates (PL1, PL2) are arranged on the outer surface sides of the array substrate 12 and the counter substrate 14, respectively.

In the array substrate 12, a plurality of pixels PX arrayed in a matrix in the display region 11 are formed on the inner surface, and an approximately rectangular region where an image is displayed by the pixels PX is defined.

In the display region 11, a plurality of scanning lines SL (SL1, SL2, . . . ) extend along a row direction D1 in which the pixels PX are aligned. In addition, a plurality of signal lines DL (DL1, DL2, . . . ) extend along a column direction D2 in which the pixels PX are aligned, orthogonally to the plurality of scanning lines SL. Switching elements SW are arranged for the respective pixels PX near intersections of the scanning lines SL and the signal lines DL. Furthermore, a pixel electrode PE and the like connected to each of the switching elements SW are also provided.

The counter substrate 14 comprises a counter electrode CE common to all the pixels PX in the display region 11.

The array substrate 12 and the counter substrate 14 are arranged such that the pixel electrode PE and the counter electrode CE are opposed to each other. A predetermined gap is therefore formed between the substrates 12 and 14. Peripheral end portions of the array substrate 12 and the counter substrate 14 are fixed by a sealant S in a state in which the predetermined gap is formed.

The liquid crystal layer LQ is formed of a liquid crystal composition which is charged into the predetermined gap between the array substrate 12 and the counter substrate 14 and which is sealed in the gap by a sealing material (not shown).

A circuit board 18 is electrically connected to an edge of the liquid crystal display panel 10 via a flexible substrate 16. The circuit board 18 comprises a driving circuit (not shown) configured to generate a drive signal and a control circuit (not shown) configured to generate a control signal, to supply the drive signal and the control signal to the liquid crystal display panel 10. The circuit board 18 is arranged on the back surface side of the illuminating module 20 by bending the flexible substrate 16 toward the back surface side of the illuminating module 20.

The illuminating module 20 comprises an approximately rectangular emitting region 20A from which light is emitted. The illuminating module 20 is overlaid on the back surface of the liquid crystal display panel 10 such that the emitting region 20A corresponds to the display region 11 of the liquid crystal display panel 10.

The front cover 30 comprises a window 30W through which the display region 11 of the liquid crystal display panel 10 is exposed. The front cover 30 engages with a housing of the illuminating module 20 and holds the liquid crystal display panel 10 and the illuminating module at a surrounding of the display region 11.

Figure 2:
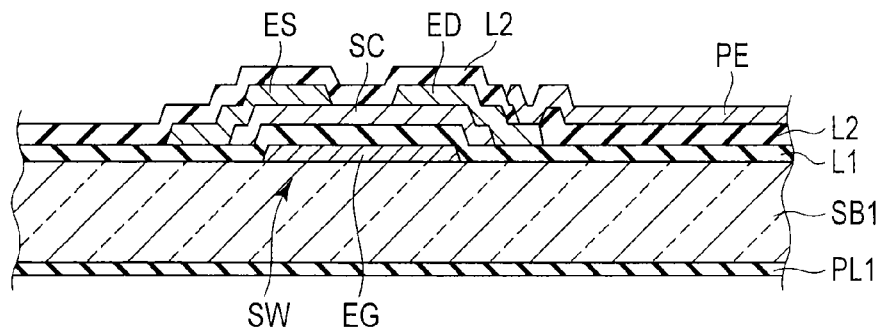
FIG. 2 is a partially sectional view of the liquid crystal display apparatus shown in FIG. 1, illustrating a configuration example of a switching element in the liquid crystal display apparatus.

FIG. 2 is a view illustrating a configuration example of the switching element SW in the liquid crystal display apparatus according to the present embodiment.

The switching element SW comprises a semiconductor layer SC, a gate electrode EG, a source electrode ES, and a drain electrode ED.

The gate electrode EG is arranged on a transparent insulating substrate SB1 of the array substrate 12. The gate electrode EG is electrically connected with (or formed integrally with) the scanning line SL corresponding thereto.

The gate electrode EG and the insulating substrate SB1 are covered with an insulating layer L1. The semiconductor layer SC is formed in a gate forming region on the insulating layer L1 and arranged above the gate electrode EG via the insulating layer L1. The semiconductor layer SC is formed of amorphous silicon or polysilicon.

The source electrode ES is formed on the semiconductor layer SC and is electrically connected with the semiconductor layer SC. The source electrode ES is electrically connected with (or formed integrally with) the signal line DL corresponding thereto.

The drain electrode ED is formed on the semiconductor layer SC and is electrically connected with the semiconductor layer SC. The drain electrode ED is formed on a plane on which the signal lines DL are formed as a layer of the same level as a layer of the signal lines DL, and is arranged so as to be electrically separated from the signal lines DL. The drain electrode ED is electrically connected with the pixel electrode PE corresponding thereto, through contact holes provided in an insulating layer L2 arranged as an upper layer.

If drive signals are applied from the circuit board 18 to the liquid crystal display panel 10, a voltage is applied to the scanning lines SL. A predetermined voltage is applied to the semiconductor layer SC from the gate electrodes EG connected to the scanning lines SL, and the source electrodes ES and the drain electrodes ED thereby become conductive. Then, an image signal is supplied from the corresponding signal line DL to the corresponding pixel electrode PE.

The circuit board 18 applies to the liquid crystal display panel 10 the drive signals to sequentially apply the voltage to the scanning lines SL, outputs the image signals to the signal lines DL, and supplies the image signals to the pixel electrodes PE corresponding to respective lines of the scanning lines SL.

Figure 3:
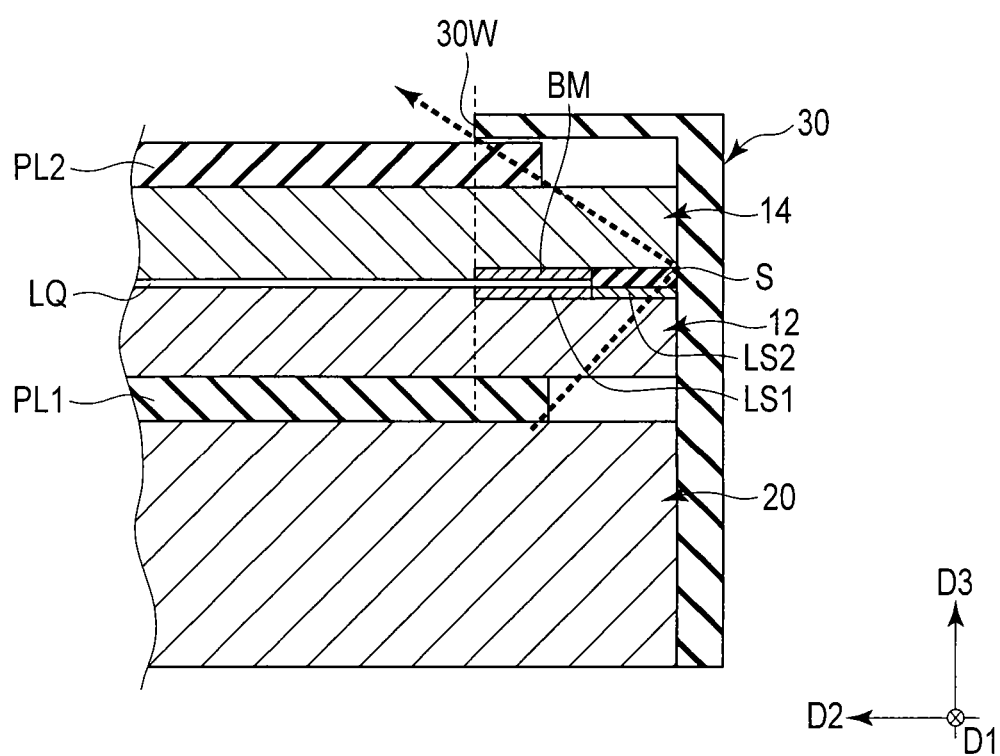
FIG. 3 is a partially sectional view of the liquid crystal display apparatus shown in FIG. 1, schematically showing an example of a cross-section of the liquid crystal display apparatus.

FIG. 3 schematically shows an example of a cross-section of the liquid crystal display apparatus shown in FIG. 1. A structure of a vicinity to an end portion of the liquid crystal display panel 10 is shown in FIG. 3.

The array substrate 12 comprises a first shading portion LS1 arranged in at least a part of a region surrounding the display region 11, and a second shading portion LS2 arranged in at least a part of a region between the first shading portion LS1 and the substrate end portion, as shading means.

In the present embodiment, the first shading portion LS1 is formed on a plane on which the scanning lines SL or the signal lines DL are formed, as a layer of approximately the same level as the plane, and is arranged to surround the display region 11. Similarly, the second shading portion LS2 is formed on a plane on which at least either the scanning lines SL or the signal lines DL are formed, as a layer of approximately the same level as the plane, and is arranged as a layer of approximately the same level as the first shading portion LS1.

The counter substrate 14 comprises a black matrix BM as shading means. The black matrix BM is arranged to face the first shading portion LS1, and is also arranged at a position opposite to the signal lines DL and the scanning lines SL. The black matrix BM is formed of a resin material colored in, for example, black. By arranging the black matrix BM so as to surround the periphery of the display region 11, light which enters from the display region 11 and is reflected on the first shading portion LS1 and the second shading portion LS2 can also be shielded.

For example, if the second shading portion LS2 is not provided, light emitting from the illuminating module 20 may be reflected to the display region 11 side, in a region around the display region 11 as indicated by a broken line, and visually recognized by the user. In this case, an emission line may be visually recognized on the periphery of the display region 11, which may cause deterioration of display quality.

If a gap between the liquid crystal display panel 10 and the front cover 30 is shaded by a shade tape or the like to improve the deterioration of the display quality, the number of members necessary to manufacture the liquid crystal display apparatus is increased and the manufacturing steps are also increased. Reduction of manufacturing costs is therefore considered difficult.

In addition, if the first shading portion LS1 and the black matrix BM are extended to an end portion of the array substrate 12 to improve the deterioration of the display quality, there are fears that when the liquid crystal display panel 10 is cut out from the mother board, the board may be peeled off at an end portion of the liquid crystal display panel 10 due to cleavage defect in the first shading portion LS1 and the black matrix BM, that bonding defect may occur between the array substrate 12 and the counter substrate 14 due to peeling of the first shading portion LS1 and the black matrix BM, and that portions of the first shading portion LS1 and the black matrix BM exposed to the outside may corrode and the corrosion may proceed to the display region 11.

Thus, in the present embodiment, the second shading portion LS2 is arranged between the insulating layer L1 of the array substrate 12 and the substrate end portion in order to prevent the light emitting from the illuminating module 20 from reflecting to the display region 11 side, at the end portion of the liquid crystal display panel 10, and being visually recognized by the user. The second shading portion LS2 is segmented and formed such that a segment of a first shading pattern region arranged near the end portion of the array substrate 12 and a segment of a second shading pattern region arranged near the end portion of the array substrate 12 are discontinuous and separated from each other, as described later.

Figure 4A:
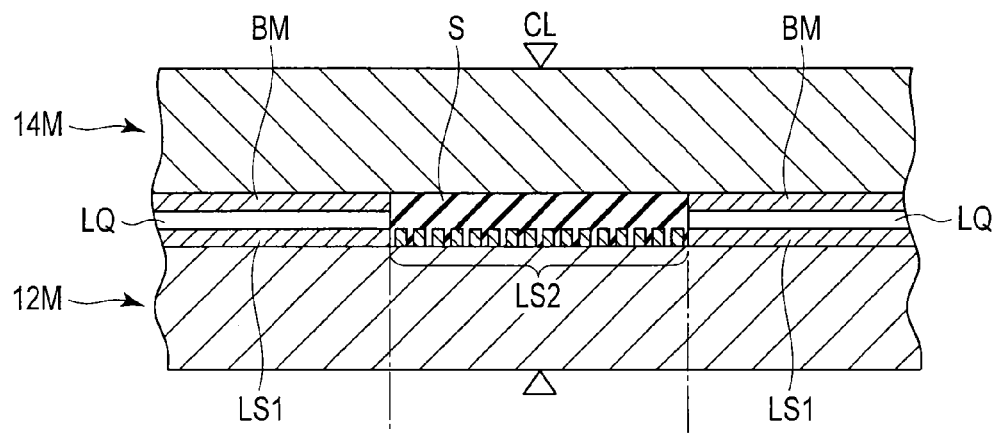
FIG. 4A and FIG. 4B are a partially sectional view and a plan view of motherboards near a cleavage line, respectively, showing a part of a configuration example of the motherboards in a state in which the liquid crystal display panel shown in FIG. 1 is to be cut out.
Figure 4B:
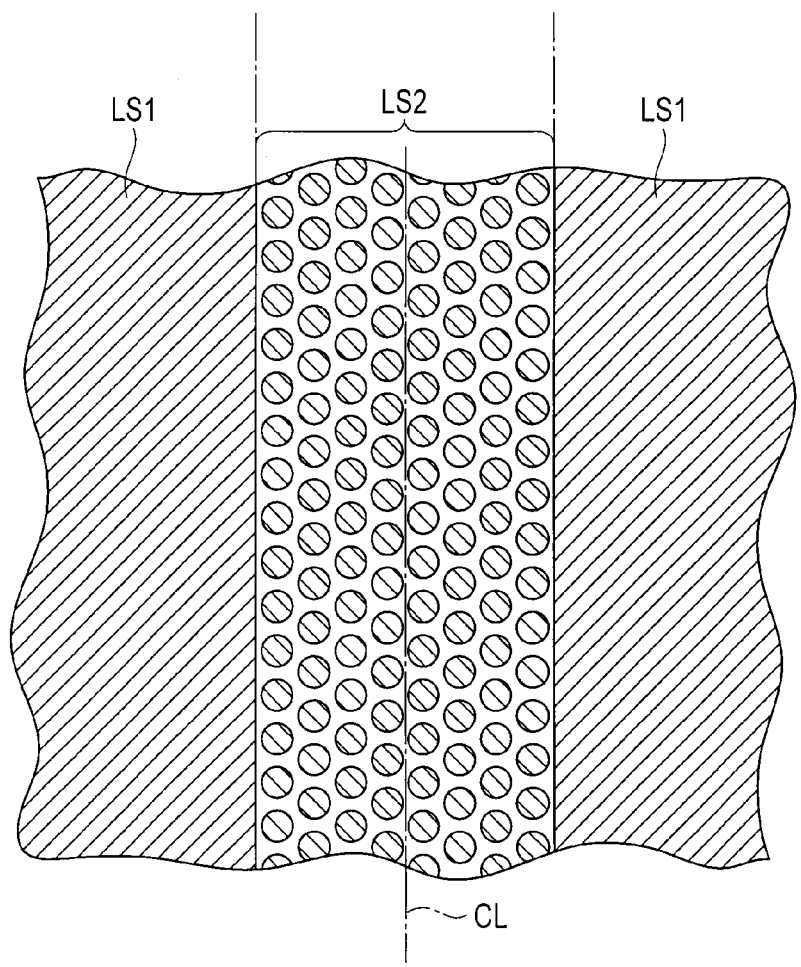

FIG. 4A and FIG. 4B are views showing a configuration example of motherboards 12M and 14M near a cleavage line CL in a state in which the liquid crystal display panel shown in FIG. 1 is to be cut out. In FIG. 4A and FIG. 4B, constituent elements necessary for explanations alone are shown, and descriptions of the other constituent elements are omitted. In FIG. 5 to FIG. 8, too, constituent elements necessary for explanations alone are shown, and descriptions of the other constituent elements are omitted.

The cleavage line CL is a reference line for cutting. By cutting the motherboards 12M and 14M in an integrated structure along the cleavage line CL, at least two liquid crystal display panels are cut out.

The first motherboard 12M from which a plurality of array substrates 12 are cut out and the second motherboard 14M from which a plurality of counter substrates 14 are cut out are bonded to be opposed to each other by the sealant S arranged so as to surround the display region 11. After that, the first motherboard 12M and the second motherboard 14M bonded to be opposed to each other are cleaved along the cleavage line CL.

At the cutting, the second shading portion LS2 is arranged in a region which is approximately in line symmetry about the cleavage line CL. The sealant S is arranged between the first motherboard 12M and the second motherboard 14M including a position of the cleavage line CL. The first shading portion LS1 and the black matrix BM are arranged to sandwich the second shading portion LS2 and the sealant S from both sides, as shown in FIG. 4A. The sealant S is therefore arranged along a boundary of the liquid crystal display panel 10, at the cutting.

The second shading portion LS2 is formed by a number of pattern segments such that a shading pattern region arranged in vicinity of the end portion of the liquid crystal display panel 10 and a shading pattern region arranged in vicinity of the first shading portion LS1 are discontinuous. In other words, the vicinity of the end portion of the liquid crystal display panel 10 of the second shading portion LS2 and the vicinity of the first shading portion LS1 are discontinuous, and are considered separable between the pattern segments. In the example shown in FIG. 4B, the shading pattern segments of the second shading portion LS2 are shaped in dot. The dots of the second shading portion LS2 are not mutually superposed, but are spaced apart with predetermined intervals.

By arranging the second shading portion LS2 in which the shading pattern segments in the vicinity of the end portion of the liquid crystal display panel 10 and the shading pattern segments in the vicinity of the first shading portion LS1 are discontinuous as described above, the region surrounding the display region 11 of the liquid crystal display panel 10 can be shaded, and the light can be prevented from being diffracted to the display region 11 side and being visually recognized.

The vicinity of the display region 11, in the region surrounding the display region 11, is shaded by the first shading portion LS1 and the black matrix BM. Since the first shading portion LS1 and the black matrix BM are formed in a solid pattern, leak light in the vicinity of the display region 11 can be effectively prevented.

Furthermore, even if the cleavage defect occurs in the shading pattern of the second shading portion LS2 in the vicinity of the cleavage line CL when the liquid crystal display panel 10 is cut out from the motherboards, the cleavage defect gives no influences to a shading pattern adjacent to the defective shading pattern, by arranging the pattern segments of the second shading portion LS2 such that the shading pattern region in the vicinity of the end portion of the liquid crystal display panel 10 and the shading pattern region in the vicinity of the first shading portion LS1 are discontinuous and separable as described above.

Even if the shading pattern of the second shading portion LS2 is peeled off, a part of the second shading portion LS2 is merely peeled off, and the bonding defect between the array substrate 12 and the counter substrate 14 can be suppressed.

Even if the portion of the second shading portion LS2 exposed to the outside is corroded, proceeding of the corrosion to the adjacent shading pattern can be prevented since the second shading portion LS2 is constituted by a plurality of discontinuous shading pattern segments. Thus, the corrosion of the second shading portion LS2 is stopped in the vicinity of the end portion of the liquid crystal display panel 10 and the proceeding of the corrosion to the display region 11 can be prevented.

Since the second shading portion LS2 is formed in the layer of the same level formed on the same plane as the plane on which the scanning lines SL or the signal lines DL are formed, and is arranged on the substrate 12M, the second shading portion LS2 can be formed simultaneously with the scanning lines SL or the signal lines DL. The manufacturing costs can be therefore lowered without increasing the manufacturing steps of the liquid crystal display apparatus.

In other words, according to the present embodiment, the liquid crystal display apparatus of excellent display quality can be provided.

FIG. 5 shows a configuration example of the motherboards near the cleavage line CL in a state in which the liquid crystal display panel shown in FIG. 1 is to be cut out.

Another pattern of the second shading portion LS2 is illustrated in FIG. 5. In this example, a plurality of segments of a waveform pattern extending in a direction approximately parallel to the cleavage line CL are arranged in each of the shading pattern regions, in the second shading portion LS2, such that the shading pattern region arranged in the vicinity of the end portion of the liquid crystal display panel 10 and the shading pattern region arranged in the vicinity of the first shading portion LS1 are discontinuous.

In this example, too, the shading pattern region arranged in the vicinity of the end portion of the array substrate 12 of the second shading portion LS2, and the shading pattern region arranged in the vicinity of the first shading portion LS1 are discontinuous. Thus, if the second shading portion LS2 is formed in the waveform pattern as shown in FIG. 5, the same advantage as that in the case shown in FIG. 4B can also be obtained.

In other words, even if the cleavage defect occurs at the second shading portion LS2 when the liquid crystal display panel 10 is cut out from the motherboards, the cleavage defect gives no influences to the shading pattern segments of the second shading portion LS2 adjacent to the defective second shading portion LS2. The bonding defect between the array substrate 12 and the counter substrate 14 can be suppressed. The proceeding of the corrosion to the display region 11 can be prevented. Furthermore, the manufacturing costs can be lowered without increasing the manufacturing steps of the liquid crystal display apparatus.

Thus, according to the present embodiment, the liquid crystal display apparatus of excellent display quality can be provided.

Next, a liquid crystal display apparatus according to a second embodiment will be described in detail with reference to the drawings. In the following descriptions, the same constituent elements as those of the liquid crystal display apparatus according to the first embodiment are denoted by the same reference numbers and symbols, and their explanations are omitted.

The liquid crystal display apparatus according to the present embodiment includes shading pattern segments in which a second shading portion LS2 is provided on an array substrate 12 and shading pattern segments in which a second shading portion LS2 is provided on a counter substrate 14.

Figure 6A:
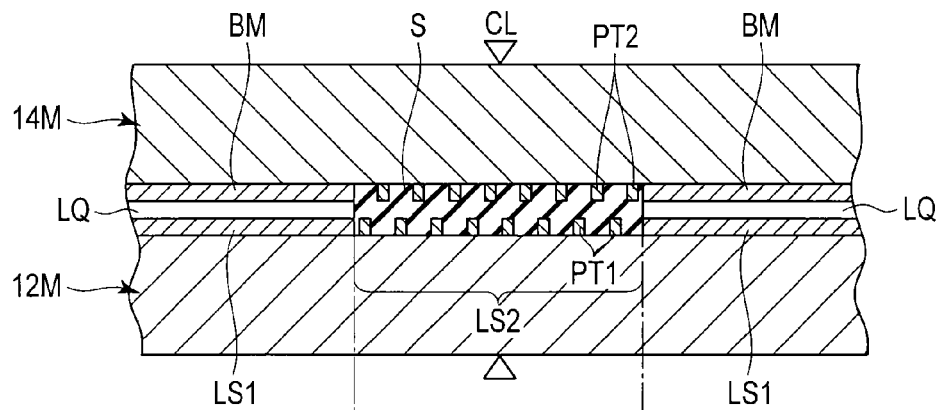
FIG. 6A and FIG. 6B are a partially sectional view and a plan view of motherboards near a cleavage line, respectively, showing a part of a configuration example of the motherboards in a state in which a liquid crystal display panel of a liquid crystal display apparatus according to a second embodiment is to be cut out.
Figure 6B:
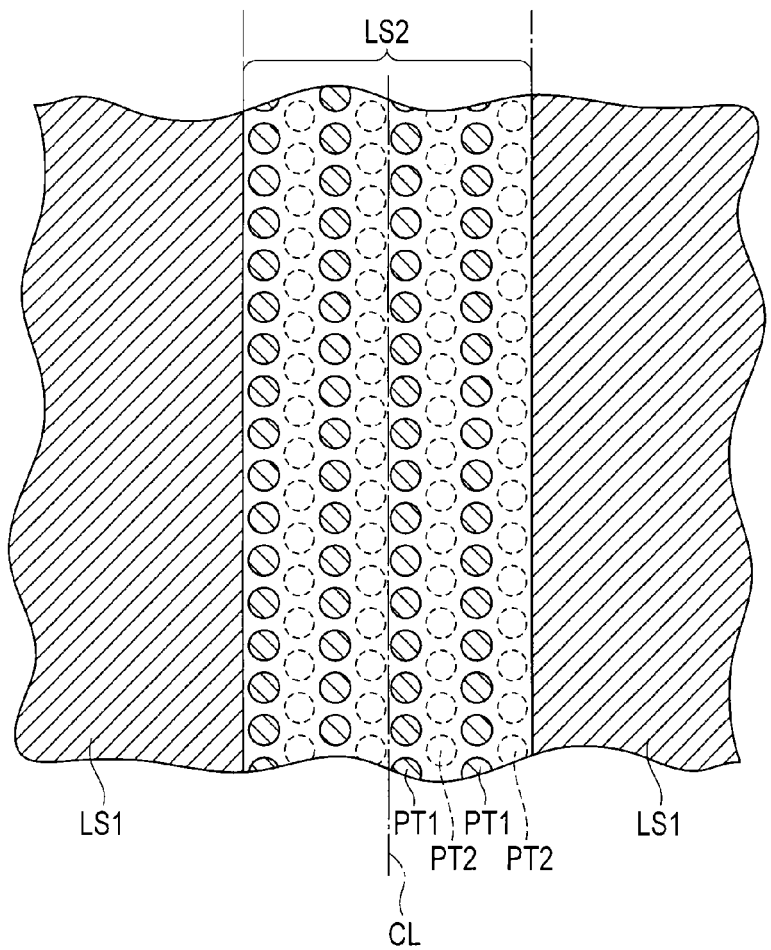

FIG. 6A and FIG. 6B show a configuration example of motherboards near a cleavage line, in a state in which a liquid crystal display panel 10 of the liquid crystal display apparatus according to the present embodiment is to be cut out.

At the cutting, the second shading portion LS2 is arranged in a region which is approximately in line symmetry about the cleavage line CL. A sealant S is arranged between a first motherboard 12M and a second motherboard 14M including a position of the cleavage line CL. In other words, the second shading portion LS2 and the sealant S are arranged to be sandwiched between structures of pairs of first shading portions LS1 and black matrixes BM as shown in FIG. 6B. At the cutting, a structure of the second shading portion LS2 and the sealant S is separated into two portions about the cleavage line CL. The sealant S is therefore arranged along a boundary of the liquid crystal display panel 10, at the cutting.

The second shading portion LS2 comprises a plurality of shading pattern segments PT1 on the substrate 12, and a plurality of shading pattern segments PT2 which are arranged on the substrate 14M as a layer of a level different from the shading pattern segments PT1 on a plane different from the shading pattern segments PT1. In the present embodiment, the shading pattern segments PT1 are arranged on the first motherboard 12M and the shading pattern segments PT2 are arranged on the motherboard 14M. The shading pattern segments PT1 are arranged on a plane on which scanning lines SL or signal lines DL are formed, as a layer of the same level as the plane. The shading pattern segments PT2 are arranged on a plane on which the black matrix BM is formed, as a layer of the same level as the plane.

The shading pattern segments PT1 and PT2 are shaped in dot. Rows of the plurality of shading pattern segments PT1 approximately parallel to the cleavage line CL, and rows of the plurality of shading pattern segments PT2 approximately parallel to the cleavage line CL, are aligned alternately between an end of the liquid crystal display panel 10 and an end of a display region 11. In other words, the shading pattern segments PT1 are arranged between the opposed positions of the shading pattern segments PT2, on the first motherboard 12M.

The shading pattern segments PT1 arranged in vicinity of the end portion of the array substrate 12 and the shading pattern segments PT1 arranged in vicinity of the end portions of the first shading portions LS1 are discontinuous. The shading pattern segments PT2 arranged in vicinity of the end portion of the counter substrate 14 and the shading pattern segments PT2 arranged in vicinity of the end portions of the black matrixes BM are discontinuous.

The liquid crystal display apparatus according to the present embodiment is the same as the liquid crystal display apparatus according to the above-described first embodiment except the constitution of the second shading portion LS2.

In other words, even if the cleavage defect occurs at the shading pattern segments PT1 and PT2 of the second shading portion LS2 in the vicinity of the cleavage line CL when the liquid crystal display panel 10 is cut out from the first motherboard 12M and the second motherboard 14M, the cleavage defect gives no influences to the shading pattern segments PT1 and PT2 of the second shading portion LS2 adjacent to the defective shading pattern segments. The bonding defect between the array substrate 12 and the counter substrate 14 can be suppressed. The proceeding of the corrosion to the display region 11 can be prevented.

Furthermore, the manufacturing costs can be lowered without increasing the manufacturing steps of the liquid crystal display apparatus since the shading pattern segments PT1 can be formed simultaneously with the scanning lines SL or the signal lines DL and since the shading pattern segments PT2 can be formed simultaneously with the black matrixes BM.

Thus, according to the present embodiment, the liquid crystal display apparatus of excellent display quality can be provided.

Next, a liquid crystal display apparatus according to a third embodiment will be described in detail with reference to the drawings.

The liquid crystal display apparatus according to the present embodiment is constituted by a pattern in which a second shading portion LS2 is provided in a plurality of layers of an array substrate 12.

Figure 7A:
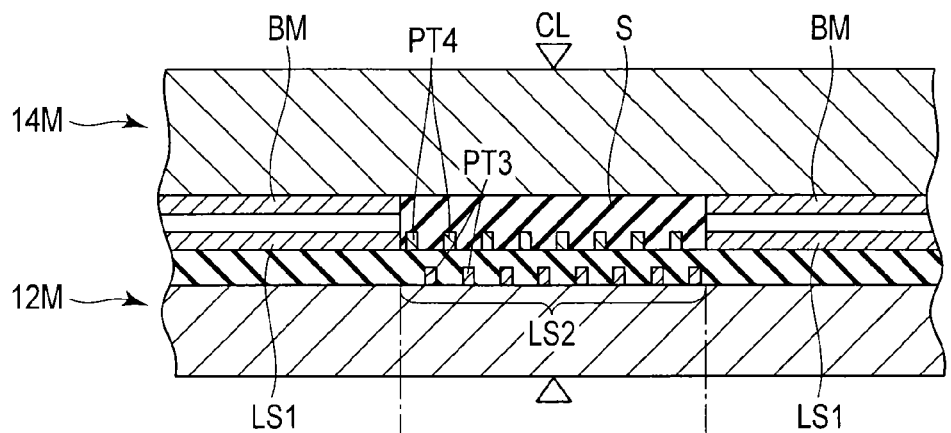
FIG. 7A and FIG. 7B are a partially sectional view and a plan view of motherboards near a cleavage line, respectively, showing a part of a configuration example of the motherboards in a state in which a liquid crystal display panel of a liquid crystal display apparatus according to a third embodiment is to be cut out.
Figure 7B:
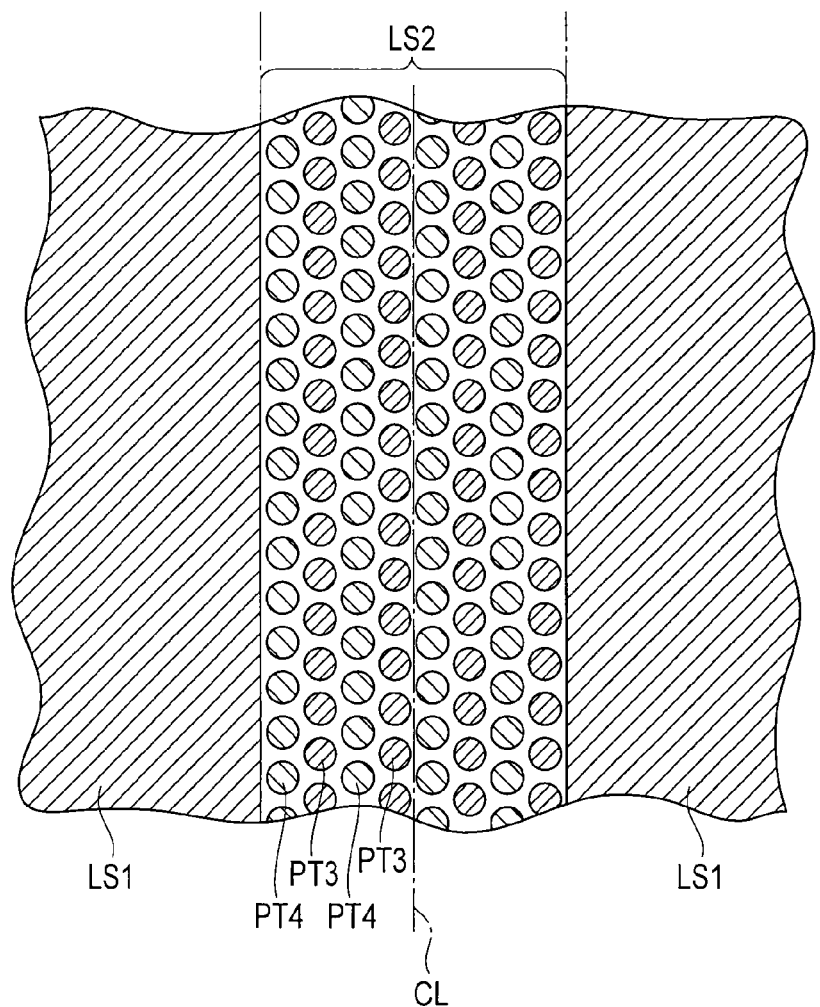

FIG. 7A and FIG. 7B show a configuration example of motherboards near a cleavage line CL, in a state in which a liquid crystal display panel 10 of a liquid crystal display apparatus according to the present embodiment is to be cut out.

At the cutting, the second shading portion LS2 is arranged in a region which is approximately in line symmetry about the cleavage line CL. A sealant S is arranged between a first motherboard 12M and a second motherboard 14M including a position of the cleavage line CL.

In addition, a first shading portion LS1 and a black matrix BM are arranged to be sandwiched between structures of pairs of the second shading portions LS2 and sealants S. The sealant S is therefore arranged along a boundary of the liquid crystal display panel 10, at the cutting.

The second shading portion LS2 comprises a plurality of shading pattern segments PT3 arranged on a first motherboard 12M, and a plurality of shading patterns segments PT4 arranged on a second motherboard 14M. The shading pattern segments PT3 and the shading pattern segments PT4 are arranged as layers of different levels via an insulating layer. For example, the shading pattern segments PT3 are arranged on the same plane as scanning lines SL, as a layer of the same level as the scanning lines SL. The shading pattern segments PT4 are arranged on the same plane as signal lines DL, as a layer of the same level as the signal lines DL.

The shading pattern segments PT3 and PT4 are shaped in dot. Rows of the plurality of shading pattern segments PT3 approximately parallel to the cleavage line CL, and rows of the plurality of shading pattern segments PT4 approximately parallel to the cleavage line CL, are aligned alternately. In other words, the shading pattern segments PT3 are arranged between positions opposed to the shading pattern segments PT4, in a layer under the shading pattern segments PT4.

The shading pattern segments PT3 arranged in vicinity of the end portion of the array substrate 12 and the shading pattern segments PT3 arranged in vicinity of end portions of the first shading portions LS1 are discontinuous. The shading pattern segments PT4 arranged in vicinity of the end portion of the array substrate 12 and the shading pattern segments PT4 arranged in vicinity of the end portions of the first shading portions LS1 are discontinuous.

The liquid crystal display apparatus according to the present embodiment is the same as the liquid crystal display apparatus according to the above-described first embodiment except the constitution of the second shading portion LS2.

In other words, even if the cleavage defect occurs at the shading pattern segments PT3 and PT4 in the vicinity of the cleavage line CL when the liquid crystal display panel 10 is cut out from the first motherboard 12M and the second motherboard 14M, the cleavage defect gives no influences to the shading pattern segments PT3 and PT4 adjacent to the defective shading pattern segments PT3 and PT4. The bonding defect between the array substrate 12 and the counter substrate 14 can be suppressed. The proceeding of the corrosion to the display region 11 can be prevented.

Furthermore, the manufacturing costs can be lowered without increasing the manufacturing steps of the liquid crystal display apparatus since the shading pattern segments PT3 can be formed simultaneously with the scanning lines SL and since the shading pattern segments PT4 can be formed simultaneously with the signal lines DL.

Thus, according to the present embodiment, the liquid crystal display apparatus of excellent display quality can be provided.

Figure 8A:
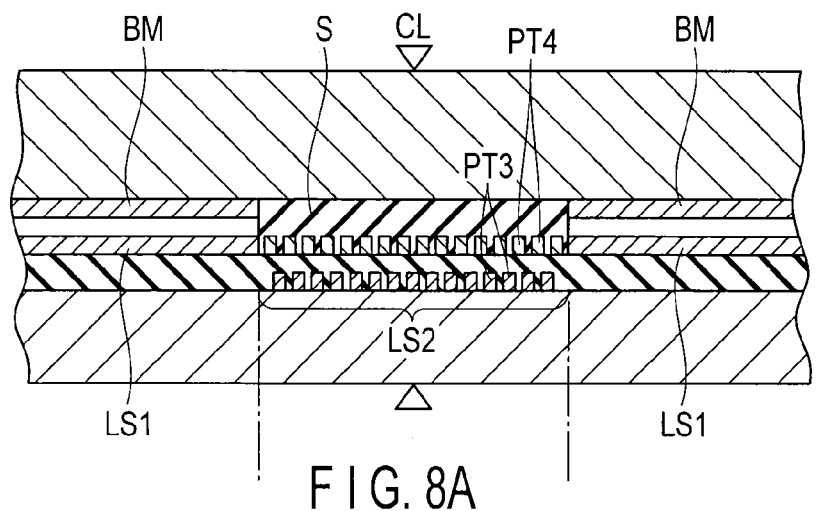
FIG. 8A and FIG. 8B are a partially sectional view and a plan view of motherboards near a cleavage line, respectively, showing a part of a configuration example of the motherboards in a state in which the liquid crystal display panel of the liquid crystal display apparatus according to the third embodiment is to be cut out.
Figure 8B:
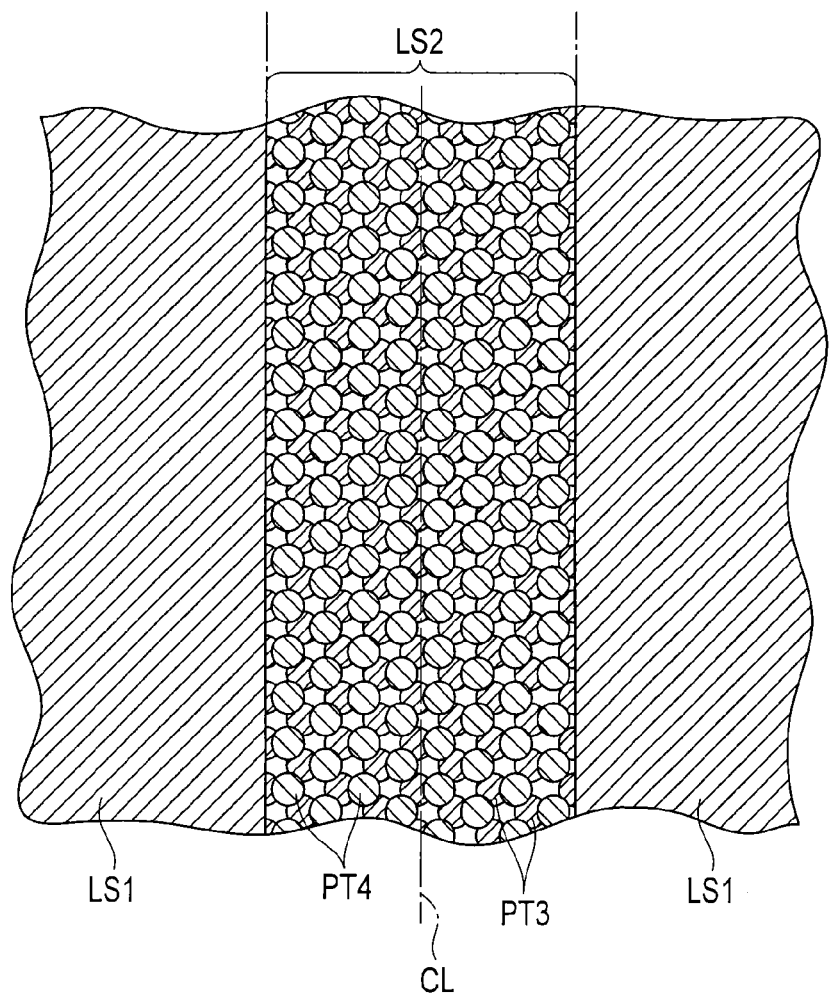

FIG. 8A and FIG. 8B show a configuration example of the motherboards near the cleavage line CL, in a state in which the liquid crystal display panel 10 of the liquid crystal display apparatus according to the present embodiment is to be cut out.

FIG. 8A shows another example of the second shading portion LS2. In this example, the second shading portion LS2 comprises a plurality of shading pattern segments PT3 arranged on the first motherboard 12M, and a plurality of shading patterns segments PT4 arranged on a layer of the sealant S on the shading pattern segments PT3 and embedded in the sealant S. The shading pattern segments PT3 and the shading pattern segments PT4 are arranged on different levels in the insulating layers as shown in FIG. 8A, as layers separated in the insulating layers. For example, the shading pattern segments PT3 are arranged as the same layer as the scanning lines SL. The shading patterns segments PT4 are arranged on the sealant S, in the same layer as the signal lines DL.

The shading pattern segments PT3 and PT4 are shaped in dot, and arranged to be superposed via the insulating layer, between the end of the liquid crystal display panel 10 and the end of the display region 11. Rows of the plurality of shading pattern segments PT3 approximately parallel to the cleavage line CL, and rows of the plurality of shading pattern segments PT4 approximately parallel to the cleavage line CL, are aligned alternately such that the shading pattern segments PT3 and PT4 are partially superposed. In other words, the shading pattern segments PT3 are arranged to be superposed on a region between the shading pattern segments PT4 and a part of the shading pattern segments PT4, in a layer under the shading pattern segments PT4. For example, each of centers of dots of the shading pattern segments PT3 is positioned between the shading pattern segments PT4, and each of centers of dots of the shading pattern segments PT4 is positioned between the shading pattern segments PT3.

The shading pattern segments PT3 arranged in vicinity of the end portion of the array substrate 12 and the shading pattern segments PT3 arranged in vicinity of the display region 11 are discontinuous. The shading pattern segments PT4 arranged in vicinity of the end portion of the array substrate 12 and the shading pattern segments PT4 arranged in vicinity of the end portion of the display region 11 are discontinuous.

In the example shown in FIG. 8A and FIG. 8B, an interval between the shading pattern segments PT3 and the shading pattern segments PT4 arranged in the respective layers is smaller than that in the example shown in FIG. 7A and FIG. 7B. When the second shading portion LS2 includes the shading pattern segments PT3 and the shading pattern segments PT4 arranged in a plurality of layers as described in the present embodiment, the shading pattern segments PT3 and the shading pattern segments PT4 arranged in the vicinity of the end portion of the substrate in the respective layers may be discontinuous with the shading pattern segments PT3 and the shading pattern segments PT4 arranged in the vicinity of the display region 11 even if the shading pattern segments PT3 and the shading pattern segments PT4 are arranged in different layers so as to superpose in a direction D3 approximately orthogonal to the substrate surface. By thus arranging the shading pattern segments PT3 and the shading pattern segments PT4 in a plurality of layers so as to superpose each other, surrounding to the display region can be shaded more effectively.

The liquid crystal display apparatus according to the present embodiment is the same as the above-described liquid crystal display apparatus according to the first embodiment except the configuration of the second shading portion LS2.

According to the liquid crystal display apparatus of the present embodiment, the same advantage as that of the above-described first embodiment can be obtained. In other words, even if the cleavage defect occurs at the shading pattern segments PT3 and PT4 of the second shading portion LS2 in the vicinity of the cleavage line CL when the liquid crystal display panel 10 is cut out from the first motherboard 12M and the second motherboard 14M, the cleavage defect gives no influences to the shading pattern segments PT3 and PT4 adjacent to the defective shading pattern segments. The bonding defect between the array substrate 12 and the counter substrate 14 can be suppressed. The proceeding of the corrosion to the display region 11 can be prevented.

Furthermore, the manufacturing costs can be lowered without increasing the manufacturing steps of the liquid crystal display apparatus since the shading pattern segments PT3 can be formed simultaneously with the scanning lines SL or the signal lines DL and since the shading pattern segments PT4 can be formed simultaneously with the signal lines DL.

By arranging the shading pattern segments PT3 and the shading pattern segments PT4 in a plurality of layers so as to superpose the region between the shading patterns as shown in FIG. 8B, light diffracted from the region surrounding the display region 11 to the display region 11 can be cut off more efficiently.

In other words, according to the present embodiment, the liquid crystal display apparatus of excellent display quality can be provided.

Even if the second shading portion LS2 is provided on the array substrate 12 and the counter substrate 14 as described above in the second embodiment, the same advantage as that of the above-described example shown in FIG. 8A and FIG. 8B can be obtained by arranging the shading pattern segments PT1 to be opposed to the region between the shading pattern segments PT2 and a part of the shading pattern segments PT2, in a direction (i.e., direction D3) approximately orthogonal to the substrate surface.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the second shading portion LS2 may be formed of a plurality of shading patterns alone as arranged on the counter substrate 14. In this case, the second shading portion LS2 is arranged in the same layer as the black matrix BM, and is formed such that the shading pattern arranged in the vicinity of the end of the counter substrate 14 and the shading pattern segments arranged in the vicinity of the black matrix BM are discontinuous. Even in this case, too, the same advantages as those of the above-described embodiments can be obtained.

In the above-described embodiments, the shading pattern segments of the second shading portion LS2 are shaped in dot or wave form. However, the other shape can be adopted if the shading pattern segments in the vicinity of the end of the liquid crystal display panel 10 and the shading pattern segments in the vicinity of the first shading portion LS1 or the black matrix BM are discontinuous. Furthermore, if the second shading portion LS2 includes the shading pattern segments arranged in a plurality of layers, the shading pattern segments in a plurality of layers may be in different shapes.

Moreover, the second shading portion LS2 may be arranged at at least a part of the region surrounding the display region 11 of the liquid crystal display panel 10. By providing the second shading portion LS2 at a portion alone where leak light can easily occur due to the configuration of the array substrate 12 and the counter substrate 14, the same advantages as those of the above-described embodiments can be obtained.

In any of the above-described embodiments, the liquid crystal display apparatus of excellent display quality can be implemented.

What is claimed is:

1. A liquid crystal display apparatus comprising:
    a pair of substrates having surfaces opposed to each other,
        one of the opposed surfaces having a display region, pixels being arrayed in a matrix in the display region; and
    a liquid crystal layer held between the opposed surfaces of the pair of substrates, wherein
    a first shading portion is arranged to surround the display region, the first shading portion being provided at the one of the opposed surfaces of the pair of substrates, and
    a second shading portion is further provided so as to be arranged between the first shading portion and an outer peripheral end of the one of the substrates, the second shading portion being formed of discontinuous segments.

2. The apparatus according to claim 1, wherein the one of the pair of substrates is provided with a scanning line extending along a row of array of the segments, a signal line extending along a column of the array of the segments, and a pixel switch arranged near a position at which the scanning line and the signal line intersect, and
    the second shading portion is so formed as a layer which is arranged in a layer level substantially same as that of the scanning line or the signal line.

3. The apparatus according to claim 1, wherein
    the second shading portion comprises a plurality of first shading pattern segments arranged on one of the pair of substrates, and a plurality of second shading pattern segments arranged on the other of the pair of substrates,
    the plurality of second shading pattern segments are arranged to be opposed to intervals in the first shading pattern segments.

4. The apparatus according to claim 1, wherein
    the second shading portion includes a plurality of third shading pattern segments and a plurality of fourth shading pattern segments formed as layers each which is arranged in a layer level different from that of the plurality of third shading patterns, and
    the plurality of third shading pattern segments are opposed to intervals in the plurality of fourth shading pattern segments, and the plurality of fourth shading pattern segments are opposed to intervals in the plurality of third shading pattern segments.

5. The apparatus according to claim 4, wherein
    the one of the pair of substrates is provided with a scanning line extending along a row of array of the segments, a signal line extending along a column of the array of the segments, and a pixel switch arranged near a position at which the scanning line and the signal line intersect, and
    the plurality of third shading pattern segments is so formed as layers each which is arranged in other layer level substantially same as that of the scanning line and the plurality of fourth shading pattern segments is so formed as layers each which are arranged in the layer level substantially same as that of the signal line.

* * * * *